United States Patent [19]

Shichida et al.

[11] 4,123,645
[45] Oct. 31, 1978

[54] NUMERICALLY CONTROLLED WIRE-CUTTING ELECTRIC DISCHARGE MACHINE

[75] Inventors: Hiromichi Shichida, Hino; Gotaro Gamo, Komae; Yoshiyuki Nomura, Hino; Kiyoshi Hattori, Tachikawa; Yutaka Koiwai, Koganei, all of Japan

[73] Assignee: Fujitsu Fanuc Limited, Hino, Japan

[21] Appl. No.: 768,562

[22] Filed: Feb. 14, 1977

[30] Foreign Application Priority Data

Feb. 25, 1976 [JP] Japan .................................. 51/19548

[51] Int. Cl.$^2$ ............................................. B23P 1/08
[52] U.S. Cl. ................................................ 219/69 W
[58] Field of Search ........................ 219/69 W, 69 E; 318/571; 235/151.11

[56] References Cited

U.S. PATENT DOCUMENTS

| | | | |
|---|---|---|---|
| 3,830,996 | 8/1974 | Ullmann et al. | 219/69 W |
| 3,849,624 | 11/1974 | Dulebohn et al. | 219/69 W |
| 3,943,322 | 3/1976 | Lehmann et al. | 219/69 W |
| 3,946,189 | 3/1976 | Romella et al. | 219/69 W |
| 3,987,270 | 10/1976 | Ullmann et al. | 219/69 W |
| 4,002,885 | 1/1977 | Bell et al. | 219/69 W |
| 4,016,395 | 4/1977 | Rietveld | 219/69 W |

*Primary Examiner*—Bruce A. Reynolds
*Attorney, Agent, or Firm*—Staas & Halsey

[57] ABSTRACT

A numerically controlled wire-cutting electric discharge machine composed of a numerical control apparatus controlling a feeding of a piece of work on at least three axes and a wire-cutting electric discharge apparatus. The wire-cutting discharge apparatus comprises a pair of V type slot guides which stretch a wire therebetween, a first and a second drive means which displace the work in the direction of two axes with respect to the wire electrode and a third drive means which rotates at least one of the V type slot guides around a predetermined axis, so that the relative displacement between the piece of work and the wire electrode is controlled via the first and second drive means by two outputs of the numerical control apparatus, the V type slot guide is rotated via the third drive means by another output of the numerical control apparatus so that the V type slot guide is turned a predetermined angle in the direction of the above-mentioned relative displacement.

7 Claims, 7 Drawing Figures

NUMERICALLY CONTROLLED WIRE-CUTTING ELECTRIC DISCHARGE MACHINE

BACKGROUND OF THE INVENTION

1. Field of the Invention

The present invention relates to a numerically controlled wire-cutting electric discharge machine, more specifically, a machine which cuts a piece of work by a discharge which is produced in a small gap between the piece of work and a wire electrode which is passed through a small hole provided in the piece of work.

2. Description of the Prior Art

In the conventional wire-cutting electric discharge machine, the wire electrode is rolled and displaced from one reel to another reel in a stretched condition, and a small discharge gap is formed between the wire electrode and the piece of work which is placed at an approximately right angle to the wire electrode. Liquid such as water or oil is supplied to the above-mentioned small discharge gap and working electric pulses are repeatedly supplied between the piece of work and the wire electrode, so that the piece of work is cut in accordance with a locus which is formed by the relative displacement between the wire electrode and the piece of work. When we assume that the displacement of the wire electrode is carried out in two directions, the piece of work is cut or extracted by feeding the piece of work in an X axis and a Y axis direction at a right angle to a Z axis.

In the above-mentioned wire-cutting electric discharge apparatus, a pair of dies are conventionally used for holding a wire electrode. However, it is very troublesome for a workman to pass the wire electrode through the pair of dies. For solving this problem, a pair of V type slot guides, which are provided with a V type slot, are used so that the wire electrode can be easily stretched. However, when we use the V type slot guides, in some relative displacements between the piece of work and the wire electrode, the wire electrode is forced out of the V type slot guides. Therefore, the holding condition of the wire electrode in the V type slot guides becomes unstable and highly accurate cutting cannot be carried out.

For obviating the above-mentioned drawback, a means for closing the V type slot after setting the wire electrode in the V type slot guide is conventionally used. However, it is difficult to stretch the wire electrode because of the existence of the above-mentioned closing means.

SUMMARY OF THE INVENTION

An object of the present invention is to provide a numerically controlled wire-cutting electric discharge machine which can obviate the above-mentioned drawbacks.

Another object is to provide a wire-cutting electric discharge machine having apparatus for moving a work object relative to a wire-cutting apparatus including a pair of V type slot guides for a wire supported therebetween and with adjustable structure for at least one of the slot guides.

A still further object is to provide an electric discharge machine with a wire-cutter supported by guide slot structure and for maintaining the center line of the guide slot structure at a predetermined angle relative to movement of a work object with respect to the cutting wire.

For achieving the above-mentioned objects, a numerically controlled wire-cutting electric discharge machine which is composed of a numerical control apparatus controlling the feeding of a piece of work on at least three axes and a wire-cutting electric discharge apparatus according to the present invention, is characterized in that the wire-cutting discharge apparatus comprises a pair of V type slot guides which stretch a wire electrode, a first and a second drive means which displace the piece of work in the direction of two axes with respect to the wire electrode and a third drive means which rotates at least one of the V type slot guides around a predetermined axis, so that the relative displacement between the piece of work and the wire electrode is controlled via the first and second drive means by two outputs of the numerical control apparatus, the V type slot guide is rotated via the third drive means by another output of the numerical control apparatus so that as the V type slot guide is turned a predetermined angle in the direction of the above-mentioned relative displacement. In other words, the V slot guides are turned so as to substantially align them so that the force of the electric cutting action will hold the wire in the V slots.

Further features and advantages of the present invention will be apparent from the ensuing description, with reference to the accompanying drawings, to which, however, the scope of the invention is in no way limited.

DESCRIPTION OF THE PREFERRED EMBODIMENT

Figure 1:
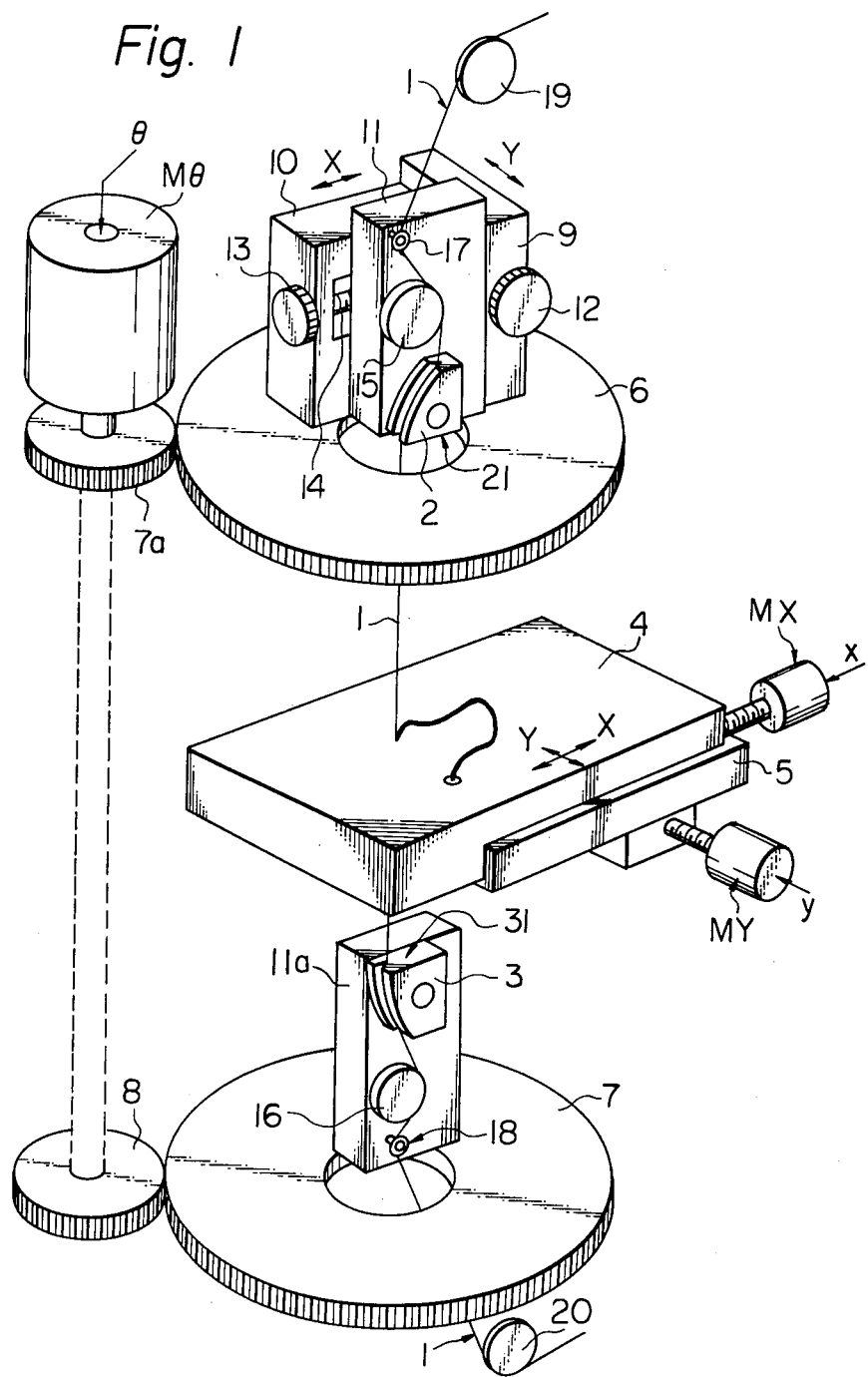
FIG. 1 shows a perspective view of one embodiment of a numerically controlled wire-cutting electric discharge machine according to the present invention.

Referring to FIG. 1, which shows an essential portion of the wire-cutting electric discharge apparatus of the numerically controlled wire-cutting electric discharge machine, a wire electrode 1 is stretched between a pair of V type slot guides 2 and 3. In the embodiment shown in FIG. 1, the wire electrode 1 is vertically stretched between the two V type slot guides 2 and 3. A piece of work 4 is placed on a table 5 which is positioned between the two V type slot guides 2 and 3. The table can be displaced by motors MX and MY in the directions of two axes which cross each other at a right angle in the horizontal plane. The pair of V type slot guides 2 and 3 which support the wire electrode 1 are, according to the present invention, constituted so as to be able to rotate around a vertical axis. The guide 2 is attached to a rotatable disc 6 and the guide 3 is attached to a rotatable disc 7, and the two rotatable discs 6 and 7 can be rotated via gear wheels 7a and 8, respectively, by a motor $M\theta$ which is provided on the same axis as the gear wheels 7a and 8.

The V type slot guide 2 is attached to the rotatable disc 6 in following manner. A first block 9 is provided on the rotatable disc 6 and a second block 10 is attached to the block 9 in such a manner that the second block 10 is displaceable along a Y axis direction shown in FIG. 1. A third block 11 is attached to the second block 10 so that the third block 11 is displaceable along an X axis direction, which axis is at a right angle to the Y axis direction. The V type slot guide 2 is fixed on the third block 11. An adjusting knob 12 is coupled to a screw shaft (not shown in the drawing) which is engaged into a nut provided on the second block 10. By adjusting the adjusting knob, the position of the second block 10 is displaced along the Y axis direction with respect to the first block 9.

A block 11a is mounted on the rotatable disc 7 and the V type slot guide 3 is mounted on the block 11a. Usually the piece of work 4 is displaced along the X axis direction and the Y axis direction which axes cross each other at a right angle in the horizontal plane. The two V type slot guides 2 and 3 are adjusted so that a lower portion 21 of the V type slot guide 2 and an upper portion 31 of the V type slot guide 3 face each other. More precisely, said positions are adjusted so that a center line of the wire of the wire electrode 1 is vertical and coincides with the center axis of the rotatable discs 6 and 7.

Thus, by controlling the motors MX and MY by the two outputs of the numerical control apparatus which control the movement of the piece of work along the directions of the X and Y axes, respectively, the piece of work can be cut along the locus of the displacement of the wire electrode 1.

Figure 2:
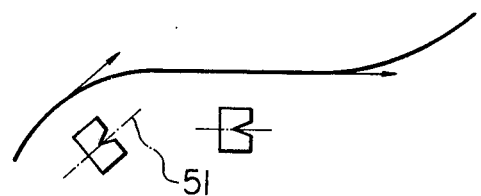
FIG. 2 shows a relation between a direction of a center line of the V type slot guide and that of a locus of the wire electrode of the machine shown in FIG. 1.

In the present invention, since the rotatable discs 6 and 7, which respectively support the V type slot guides 2 and 3, can be revolved by the motor $M\theta$, the V type slot guides 2 and 3 can be controlled so that a center line 51 of the V type slot guides 2 and 3 is turned as shown in FIG. 2, in the direction of the relative displacement between the piece of work 4 and the wire electrode 1 by controlling the motor $M\theta$ with the third output of the numerical control apparatus.

Referring again to FIG. 1, the wire electrode 1 is moved via electrode pins 15, 16, wire guide balls 17, 18 and guide rollers 19, 20.

In the embodiment shown in FIG. 1, the piece of work 4 can be cut so that it has a tapered surface. In this case, the V type slot guide 2 is offset along the X direction so that the center of the wire electrode 1 at the lower end of the V type slot guide 2 is shifted a predetermined amount from the revolvable center line of the rotatable disc 6. When the piece of work 4 is to be cut so that it has a tapered surface, the above-mentioned adjustment of the direction of the V type slot guide is applied.

Figure 3:
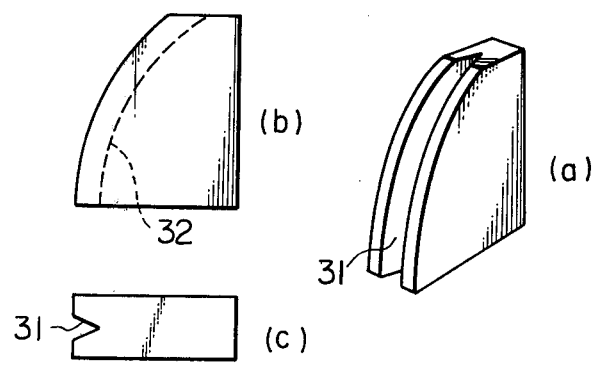
FIG. 3 shows a construction of the V type slot guide.

The construction of the V type slot guides is shown in FIG. 3. Referring to FIG. 3, (a) shows a perspective view of the V type slot guide, (b) shows a side view of said guide and (c) shows a bottom view of said guide. It is preferable that a bottom portion 32 of the V type slot guide 31 be curved so as to hold the wire electrode with certainly and that the position of the electrode pins 15 and 16 in FIG. 1, be determined so that the wire electrode 1 is pressed against the bottom portion 32 of the V type slot guide along as long a distance as possible.

Figure 4:
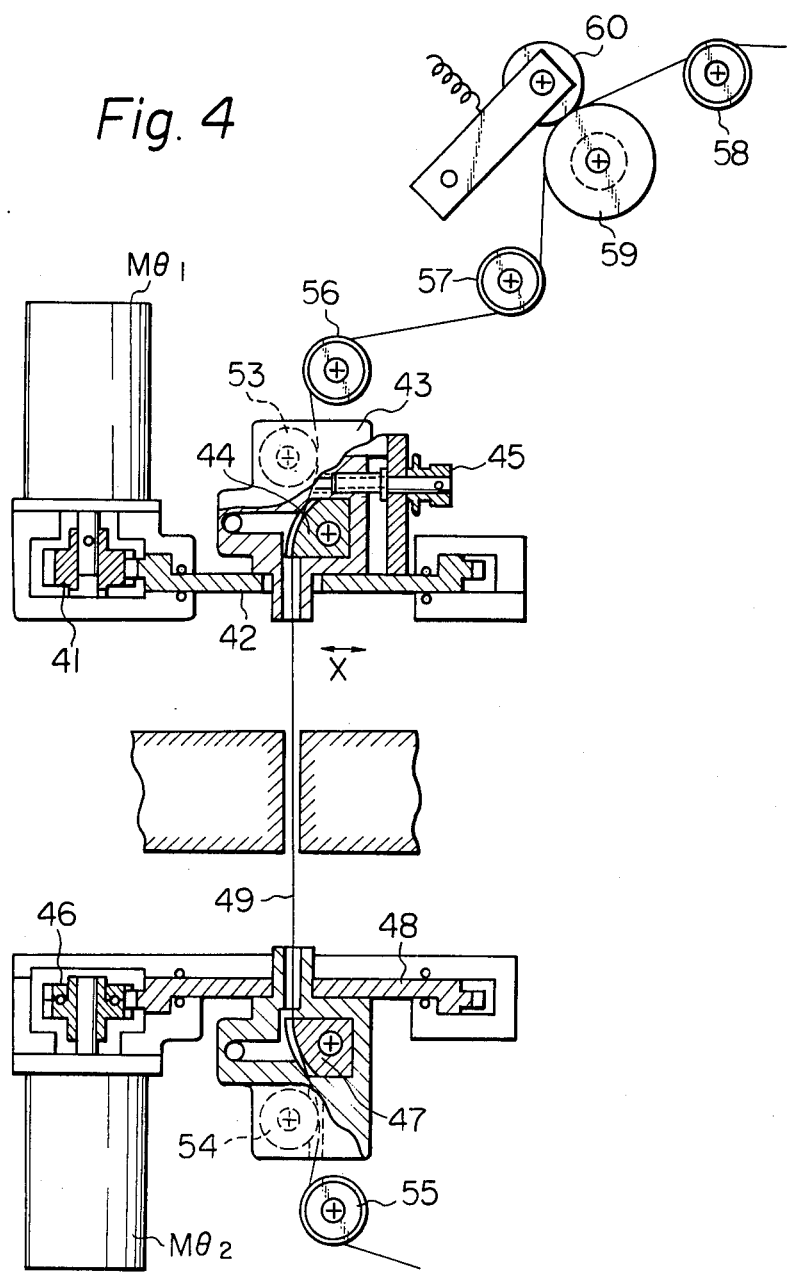
FIG. 4 shows a general view partly in cross-section, of another embodiment of the numerically controlled wire-cutting electric discharge machine according to the present invention.

FIG. 4 shows another embodiment of the wire-cutting electric discharge apparatus of the numerically controlled wire-cutting electric machine according to the present invention. The main difference between the embodiment shown in FIG. 1 and FIG. 4 is that one of the V type slot guides is adjustable only in one direction, that is only in the X direction. In this embodiment a slider 43 (or a movable block) which can be rotated via a gear 41 by a motor $M\theta_1$ is attached to a rotatable disc 42 and a V type slot guide 44 is fixed on the slider 43.

An adjusting knob 45 is coupled to a screw portion of the slider 43, and by adjusting the knob 45 the slider 43 and, therefore the V type slot guide 44 is movable along the X axis direction as, that is, the right and left direction shown in FIG. 4. In the embodiment shown in FIG. 4, by adjusting the position of the V type slot guide 44, a wire electrode 49 in the V type slot guide 44 is shifted so that the piece of work is cut so that it has a tapered form.

A motor $M\theta_2$ rotates a rotatable disc 48 via a gear 46 so as to control the direction of a V type slot guide 47 and, in the embodiment shown in FIG. 4, the motor $M\theta_2$ is provided separately from the motor $M\theta_1$.

Also in the embodiment shown in FIG. 4, the positions of the V type slot guides 44, 47 may be adjusted so that the wire center of the wire electrode 49 coincides with the rotation centers of the two rotatable discs 42 and 48. In this case, it is understood that the motors $M\theta_1$, $M\theta_2$ are synchronously controlled by the third output of the numerical control apparatus so that the directions the V type slots of the V type slot guides 44 and 47 are maintained at a certain predetermined angle with respect to the direction of the relative displacement between the piece of work and the wire electrode.

Figure 5:
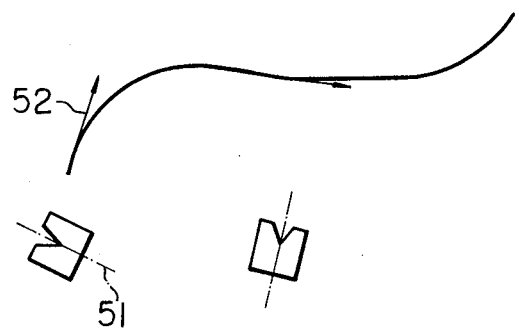
FIG. 5 shows a relation between a direction of the center line of the V type slot guide and that of a locus of the wire electrode of the machine shown in FIG. 4.

However, in the embodiment shown in FIG. 4, the center line of the V type slot of the V type slot guide 44 can be offset from the center of the rotatable disc 42, and as shown in FIG. 5 the direction of the V type slot guide 44 is controlled so that the direction the center line 51 of the V type slot guide is perpendicular with respect to the direction of the relative motion between the piece of work and the wire electrode.

In FIG. 4, the wire electrode 49 is moved via electrode pins 53, 54, guide rollers 55, 56, 57, 58, a capstan roller 59 and a pinch roller 60.

Figure 6:
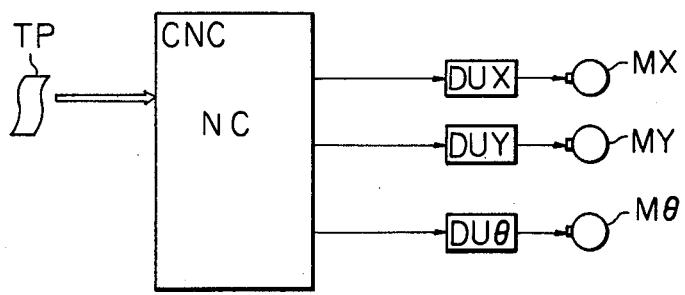
FIG. 6 shows a block diagram of a control device in the numerically controlled wire-cutting electric discharge machine according to the present invention.

Next, an explanation of the method for controlling the center line of the V type slot guide and the direction of the relative displacement between the piece of work and the wire electrode so as to maintain a constant angle between the center line and the direction of the relative displacement. Referring to FIG. 6, TP is a command tape which receives numerical information concerning the values of X and Y, etc.; CNC is a computer controlled numerical control apparatus which calculates the value of the revolution angle $\theta$ of the V type slot guide based on the stored program, and distributes pulses based on the angle $\theta$ and the numerical information; DUX, DUY and DU$\theta$ are driving circuits for pulse motors MX, MY and M$\theta$, respectively, which are respectively concerned with X and Y axis and the associated with the X, Y and $\theta$ axes, the latter axis being that of the V type slot guide.

Figure 7:
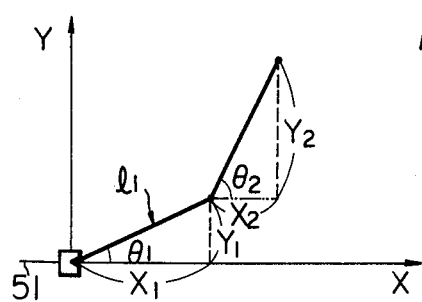
FIG. 7 shows a diagram indicating a revolving control of the V type slot guide.

For convenience of explanation, we assume that the piece of work is wire-cut along a straight line and that the center line 51 of the V type slot guide coincides with the direction of the X axis as shown in FIG. 7. When displacement command values $X_1$ and $Y_1$ are supplied from the tape TP, the computer controlled numerical control apparatus CNC begins the operation program so as to calculate the revolution angle $\theta$. In this case, the revolution angle $\theta \tan^{-1}(Y/X)$ can be calculated. However, in the present invention, for the purpose of calculating the revolution angle $\theta$ more simply, the following operation is preferable. At first, the present invention calculates the angle $\theta$ with respect to various values for the ratio of X/Y, and stores these calculated values in a memory of the apparatus CNC. Therefore, the apparatus CNC calculates only the value with respect to the ratio of $Y_1/X_1$ and determines from the memory the angle $\theta_1$ concerning the ratio $Y_1/X_1$, and therefore, the operation time can be decreased.

When the value of the angle $\theta_1$ is calculated, the value $\theta_1$ is stored in a predetermined address, and the value $\theta_1$ is converted to the number of pulses corresponding to the value $\theta_1$. Next, the converted pulses corresponding to the value $\theta_1$ are supplied to the driving circuit DU$\theta$ so as to rotate the pulse motor M$\theta$ the angle $\theta_1$.

After that, the pulse distributions to two axes are carried out simultaneously depending on the command values of X, Y. The distributed pulses which are obtained are supplied via the driving circuits DUX and DUY respectively to motors MX, MY shown in FIG. 6, so that the piece of work shown in FIG. 1 moves along the straight line $l_1$ shown in FIG. 7 and the center line of the V type slot guide is always directed to the advancing direction of the piece of work.

When the next command values $X_2$, $Y_2$ are commanded from the tape TP, the value of the angle $\theta_2$ with respect to the X axis is calculated and the value of $\theta_2 - \theta_1$ is calculated. The result is converted to the number of pulses corresponding to the angle $\theta_2 - \theta_1$, and the V type slot guide is rotated the angle $\theta_2 - \theta_1$ so that it is directed to a new advancing direction of the piece of work.

The above-mentioned explanation applies with respect to the case where the table is driven after the V type slot guide is rotated, however, it is understood that the driving of the table and the revolution of the V type slot guide can be carried out at the same time by distributing the pusles to the driving circuits DUX, DUY and DU$\theta$ at the same time. Further, when it is desired to wire-cut the piece of work along a curved line, this can be effected by approximating the curved line with continuous fine lines.

As mentioned above, according to the present invention, the stretching of the wire electrode can be accomplished very easily because a pair of the V type slot guides are used as the guide of the wire electrode, and; also, the wire electrode is maintained in the V type slot because the center line of the V type slot guide is controlled so as to turn and be directed at a predetermined angle with respect to the relative motion between the piece of work and the wire electrode. As a result wire-cutting with high reliability can be expected. Also, by holding the center line of the V type slot guide at a predetermined angle consisting of a right angle to the displacement between the piece of work and the wire electrode, the wire electrode is more stably held in the V type slot guide and the reliability of the wire-cutting can be considerably increased.

In addition, according to the present invention, the wire-cutting of the piece of work at a tapered angle can be easily carried out by offsetting the wire electrode a predetermined angle from the vertically held condition. In such an offset condition, the control of the revolution of the V type slot guide can be carried out similar to the case where the wire electrode is vertically held.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A numerically controlled wire-cutting electric discharge machine using a wire electrode comprising:
   a numerical control apparatus sending out, at least a first, a second and a third command signal for at least three control axes;
   a workpiece supporting means for supporting a workpiece;
   a first motor means which moves said workpiece in a direction along an axis in a plane which is perpendicular to a predetermined axis;
   a second motor means which moves said workpiece in another direction along another axis in said plane;
   a pair of V type slot guides including a first guide and a second guide, said first and second guides being arranged opposed to each other with respect to said workpiece so as to stretch, in a direction which coincides with said predetermined axis, said wire electrode which passes through said workpiece;
   a rotatable supporting member which supports said second guide and which can rotate around said predetermined axis;
   an offset means which offsets said second guide in a predetermined direction in said plane which is perpendicular with said predetermined axis, so that the position of said wire electrode at said first guide coincides with said predetermined axis and the position of said wire electrode at said second guide is offset a predetermined amount from said predetermined axis;
   a third motor means coupled to said rotatable supporting means for rotating said second guide around said predetermined axis;
   said numerical control apparatus supplies first and second signals to said first and second motor means, respectively, and said wire electrode moves relatively with respect to said workpiece in the plane which is perpendicular to said predetermined axis, and said numerical apparatus supplies said third signal to said third motor means and rotates said rotatable supporting means so that the surface which is determined by said predetermined axis and said wire electrode which is offset is perpendicular with respect to a relative movement between said wire electrode and said workpiece, and wherein said second guide is mounted on said rotatable supporting member in such a manner that the center line of the V type slot of said second guide is perpendicular to the relative motion between said wire electrode and said workpiece.

2. A numerically controlled wire-cutting electric discharge machine according to claim 1, wherein one of the pair of V type slot guides is attached to a first supporting member which is rotatable around a predetermined axis, the other of the V type slot guides being attached to a second supporting member which is rotatable around a predetermined axis and separate driving means for rotating said first and second supporting members respectively.

3. A numerically controlled wire-cutting electric discharge machine according to claim 1, wherein said first guide is supported with a second supporting member, and said wire electrode is supported by said first guide without offset from said predetermined axis.

4. A numerically controlled wire-cutting electric discharge machine according to claim 3 wherein said second supporting member is rotated around said predetermined axis by said third motor means.

5. A numerically controlled wire-cutting electric discharge machine according to claim 1, wherein the initial position of said first guide is determined in such a manner that the center line of said V type slot of said first guide has the same direction as that of said second guide.

6. A numerically controlled wire-cutting electric discharge machine according to claim 1, wherein said rotatable supporting member provides a screw engaged knob means, and the offset position of said second guide is determined based on the rotated position of said knob means.

7. A numerically controlled wire-cutting electric discharge machine according to claim 1, wherein said numerical control apparatus provides a memory means which stores a table concerning ratios Y/X (wherein X and Y are respectively a command value with respect to said first and second axis) and angles Q $(=\tan^{-1}(X/Y))$ corresponding said ratio Y/X, and said numerical control apparatus is programmed in such a manner that when a set of said command values along each axis $(X_1, Y_1)$, $(X_2, Y_2)$, ... is commanded, said angle Q corresponding to said command value is read from said memory means, and the differences between two successive angles $(Q_2 - Q_1)$, ... are calculated and the values of said difference are supplied to said third motor means as the command signal.

* * * * *

UNITED STATES PATENT AND TRADEMARK OFFICE
CERTIFICATE OF CORRECTION

PATENT NO. : 4,123,645
DATED : October 31, 1978
INVENTOR(S) : HIROMICHI SHICHIDA ET AL.

It is certified that error appears in the above-identified patent and that said Letters Patent are hereby corrected as shown below:

Col. 3, line 68, "certainly" should be --certainty--;

Col. 4, line 64, delete "the";

Col. 5, line 29, "$l_1$" should be --$\ell_1$--;

Col. 5, line 45, "pusles" should be --pulses--.

Signed and Sealed this

Thirteenth Day of March 1979

[SEAL]

Attest:

RUTH C. MASON
Attesting Officer

DONALD W. BANNER
Commissioner of Patents and Trademarks